US011549050B2

(12) United States Patent
Wylde et al.

(10) Patent No.: US 11,549,050 B2
(45) Date of Patent: Jan. 10, 2023

(54) AMORPHOUS DITHIAZINE DISSOLUTION FORMULATION AND METHOD FOR USING THE SAME

(71) Applicant: Clariant International Ltd., Muttenz (CH)

(72) Inventors: Jonathan Wylde, The Woodlands, TX (US); Cyril Emeka Okocha, Spring, TX (US)

(73) Assignee: CLARIANT INTERNATIONAL LTD., Muttenz (CH)

( * ) Notice: Subject to any disclaimer, the term of this patent is extended or adjusted under 35 U.S.C. 154(b) by 681 days.

(21) Appl. No.: 16/313,006

(22) PCT Filed: May 2, 2017

(86) PCT No.: PCT/EP2017/060406
§ 371 (c)(1),
(2) Date: Oct. 2, 2019

(87) PCT Pub. No.: WO2018/001604
PCT Pub. Date: Jan. 4, 2018

(65) Prior Publication Data
US 2021/0317357 A1    Oct. 14, 2021
US 2022/0340804 A9    Oct. 27, 2022

Related U.S. Application Data

(63) Continuation of application No. 15/194,050, filed on Jun. 27, 2016, now abandoned.

(30) Foreign Application Priority Data

Jul. 14, 2016 (EP) .................................. 16179372

(51) Int. Cl.
*C09K 8/524* (2006.01)
*C09K 8/532* (2006.01)

(52) U.S. Cl.
CPC .............. *C09K 8/524* (2013.01); *C09K 8/532* (2013.01); *C09K 2208/32* (2013.01)

(58) Field of Classification Search
CPC ............................ C09K 8/532; Y10S 507/932
See application file for complete search history.

(56) References Cited

U.S. PATENT DOCUMENTS 3,281,417 A      10/1966  Beck
8,920,568 B2 *  12/2014  Taylor ................. C11D 11/0041
                                              134/4
2012/0247515 A1  10/2012  Taylor
2014/0373649 A1  12/2014  Harrell

OTHER PUBLICATIONS

International Search Report for PCT/EP2017/060406, dated Jun. 21, 2017, 3 pages.
Extended European Search Report for 16179372.4 dated Dec. 16, 2016, 6 pages.

* cited by examiner

*Primary Examiner* — Aiqun Li
(74) *Attorney, Agent, or Firm* — Tod A. Waldrop

(57) ABSTRACT

The invention relates a use of an aqueous composition comprising at least one organic peroxide to dissolve amorphous dithiazine.

23 Claims, No Drawings

AMORPHOUS DITHIAZINE DISSOLUTION FORMULATION AND METHOD FOR USING THE SAME

FIELD OF INVENTION

The present invention relates to a method for removing amorphous dithiazine solids from a surface, especially relevant to dithiazine solids formed from a reaction of certain hydrogen sulfide scavengers with hydrogen sulfide gas.

BACKGROUND OF THE INVENTION

Oil and gas reservoirs can often be associated with the production of hydrogen sulfide ($H_2S$) and organic sulfidic compounds. Such sulfidic components are highly undesirable due to a combination of their toxicity and corrosive nature. It is desirable, in oil and gas operations, to remove the sulfidic components from produced oil, gas and water in a process commonly termed "sweetening". Sweetening is the generic term given to reduce or remove sulfidic components from produced hydrocarbon and/or aqueous streams in the oil and gas processing facilities. The most common approach involves the use of chemicals, termed scavengers, in particular $H_2S$ scavengers. Such chemicals are most commonly based on triazine, produced via a reaction between aldehyde and an amine. Scavengers, such as triazine, react with $H_2S$ and convert it to a less volatile (ideally non-volatile) product. Typically commercial scavenger formulations use low molecular weight aldehydes such as formaldehyde, but ketones can also be used. Amine-based $H_2S$ scavengers are very effective at removing $H_2S$ however a major drawback is that they commonly form unwanted byproducts based on amorphous dithiazine (also commonly referred to as dithiazine solids).

In particular, amorphous dithiazine is exceptionally insoluble and has been observed in many oil and gas processing systems in significant quantities. Dithiazine solids can precipitate in sufficient quantities and can form blockages in oil and gas processing equipment, tubulars, vessels, storage tanks, truck tanks, and water disposal wells. Remedial action is then required and typically involves taking a system or affected equipment offline so that manual cleaning operations, such as jetting, can be performed—these cleanup operations can be very time consuming and challenging.

U.S. Pat. No. 8,920,568 teaches the dissolution of amorphous dithiazine using hydrogen peroxide alone but at elevated temperature, 65-70° C. is typically used. Peroxides alone are very aggressive to oil and gas assets and cannot be used without the necessary additives designed to mitigate these negative effects.

U.S. Pat. No. 3,281,417 teaches the production of dithiazine compounds.

The problem to be solved by the instant invention is to provide means for dissolving dithiazine at temperature below 65-70° C., most specifically at ambient temperatures typically encountered in external oil and gas operations. Specifically, these would be temperatures of 20° C. to −10° C. The dithiazine dissolver is required to be of improved efficiency when compared to acid dissolvers of the state of the art, but shall avoid the corrosion problems caused by the oxidizing dithiazine dissolvers.

The instant invention solves this problem by using an organic peroxide as dithiazine dissolver, optionally together with a selected corrosion inhibitor that was found to be capable to avoid the corrosion on oilfield equipment even against organic peroxides.

In a first aspect, the present invention provides the use of an aqueous composition, capable of dissolving amorphous dithiazine for applications in oil and gas systems, comprising at least one organic peroxide.

In a second aspect, the present invention provides a method for dissolving amorphous dithiazine, the method comprising adding at least one organic peroxide in aqueous composition as dithiazine dissolver to dithiazine-containing systems.

Organic peroxides may be referred to as "group 1" compounds in the following.

In a more preferred embodiment, the organic peroxide is selected from peralkanoic acid with formula RCOOOH, where $R=C_1$ to $C_{10}$. In a still more preferred embodiment, the organic peroxide is peracetic acid.

In another preferred embodiment, the use or the process occurs in the presence of a corrosion inhibitor. Corrosion inhibitors may be referred to as "group 2" compounds in the following.

In one preferred embodiment, the corrosion inhibitor is selected from the group consisting of
a) imidazolines and amidoamines
b) sulfur synergists
c) phosphate esters.

In another preferred embodiment, the composition comprises additionally
3. at least one surfactant; and/or
4. at least one solvent.

The use or process according to the present invention will, in a preferred embodiment, comprise at least one component from each of groups 1 and 2. The group numbering refers to the numbers of the constituents as indicated above.

In another preferred embodiment, at least one component from group 3 is present with the components from each of groups 1 and 2.

In another preferred embodiment, at least one component from group 4 is present with the components from each of groups 1 and 2.

In another preferred embodiment, at least one component from group 4 is present with the components from each of groups 1, 2, and 3.

It is to be understood that the components no. 1, 2, 3 and 4 as mentioned above are different compounds. The instantly claimed use or process must comprise at least one species for each of the groups 1 and optionally 2, 3 and 4.

In a preferred embodiment, the inventive use or process requires 0.1 to 35 wt.-% of the organic peroxide, more preferred 10 to 20 wt.-%.

In another preferred embodiment, the inventive use or process requires 0.1 to 6 wt.-% of the corrosion inhibitor, preferably 0.5 to 5 wt.-%. In an even more preferred embodiment, the inventive use or process requires 1 to 3 wt.-% of the corrosion inhibitor If the corrosion inhibitor comprises an imidazoline or amidoamine according to group 2a), the concentration of the imidazoline or amidoamine is preferably from 1 to 3 wt.-%.

If the corrosion inhibitor comprises a sulfur synergist according to group 2b), the concentration of such sulfur synergist is preferably from 0.05 to 5 wt.-%.

If the corrosion inhibitor comprises a phosphate ester according to group 2c), the concentration of such phosphate ester is preferably from 0.05 to 5 wt.-%.

It is to be understood that the corrosion inhibitor is present during the inventive use or process in a total amount of 0.1 to 6 wt.-%. If more than one corrosion inhibitor from either group a) - c) is present, their total combined amount will be 0.1 to 6 wt.-%. In a preferred embodiment, the use or process according to the invention comprises one or more compounds from each of groups 2a, 2b and 2c, in a total amount of 0.1 to 6 wt.-%. It is common to have a combination of corrosion inhibitor bases present and the formulation will be determined by one skilled in the art in order to leverage the synergies that exist between different corrosion inhibitor base materials.

In another preferred embodiment, the concentration of the surfactant is from 1 to 20 wt.-%, if a surfactant is present.

In another preferred embodiment, water is present in balance to 100 wt.-% with a preferred range of 50 to 95 wt.-%.

If an organic solvent is present, its concentration is preferably from 0.1 to 30 wt.-%.

The weight percentages are related to the total weight of the dithiazine dissolver fluid that is used to transport the organic peroxide to the dithiazine deposit.

The inventive composition will directly contact the amorphous dithiazine solids and dissolve them without damaging the process equipment, i.e. pipes, vessels, tubulars, valves etc.

Group 1

The organic peroxide is preferably selected from
a) peralkanoic acids with formula RCOOOH, where $R=C_1$ to $C_{10}$,
b) dialkyl peroxides with 2 to 10 carbon atoms, and
c) aryl alkyl peroxides with 2 to 10 carbon atoms.

In a preferred embodiment, a peroxide whose structure is

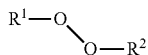

(2)

is used, wherein
$R^1$ is H, $C_1$ to $C_{30}$ alkyl, $C_1$ to $C_{30}$ alkyloyl, or $C_7$ to $C_{30}$ alkylene aromatic, and
$R^2$ is $C_1$ to $C_{30}$ alkyl, $C_1$ to $C_{30}$ 30 alkyloyl, or $C_7$ to $C_{30}$ alkylene aromatic.

Alkylene aromatic means a structure in which the peroxy group is bonded through an alkylene group to an aromatic group, and wherein the alkylene aromatic moiety has a total of 7 to 30 carbon atoms.

In a preferred embodiment, $R^1$ and $R^2$ mean independently from each other hydrogen, $C_1$ to $C_3$ alkyl or $C_1$ to $C_3$ alkyloyl.

In yet another preferred embodiment, peralkanoic acid with formula RCOOOH, where $R=C_1$ to $C_{10}$ is used as organic peroxide. Particularly preferred is a peralkanoic acid wherein R is $C_1$ to $C_3$, more preferred peracetic acid.

Group 2

The organic peroxides which are able to dissolve the amorphous dithiazine are inherently corrosive. In order to use the instant invention it is necessary to mitigate this inherent corrosivity.

The corrosion inhibitor may be selected from the groups 2a) to 2c) as explained below. There may be more than one corrosion inhibitor present.

Group 2a)

The compounds according to group 2a) are preferably prepared by the condensation of an ethylenediamine compound (A) with an acid or ester compound (B) that results in the formation of an imidazoline (C) and an amidoamine (D).

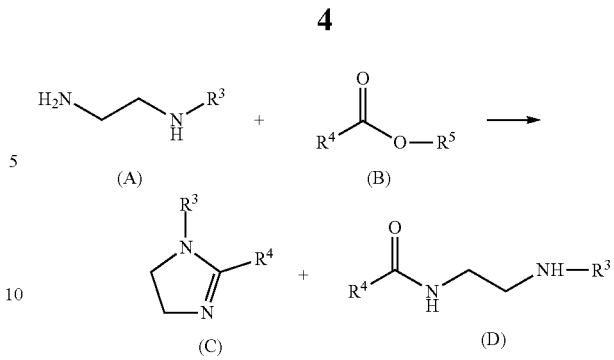

In formulae A, B, C and D,
$R^3$ is —H, —$C_2H_4NH_2$, —$C_2H_4OH$, —$(C_2H_4NH)_x$—$C_2H_4NH_2$,
X is a number from 0 to 200, preferably 1 to 5,
$R^4$ is a $C_3$ to $C_{29}$ aliphatic hydrocarbon group, and
$R^5$ is defined below.

Formula B depicts an ester.

(B)

In formula B $R^4$ is H, or a residue derived from Methanol, Ethanol, Isopropanol, a glycol, preferably ethylene, propylene or butylene glycol, or Glycerol by abstraction of one hydrogen atom from an OH group.

In a preferred embodiment, $R^4$ is selected from straight alkyl, mono unsaturated alkenyl, di unsaturated alkenyl, tri unsaturated alkenyl, oligo unsaturated alkyl, branched alkyl and cyclic alkyl. More preferred $R^4$ has a chain length of 7 to 21, particularly of 11 to 17 carbon atoms. Likewise more preferred is that $R^4$ is selected from linear or branched alkyl, monounsaturated alkenyl or diunsaturated alkenyl. $R^4$ may represent a naturally occurring hydrocarbon distribution or mixtures of the above mentioned hydrocarbon moieties. $R^4$ is the carbon chain of the acid or ester compound (B). The acid or ester compound (B) is preferably selected from tall oil fatty acid and its derivatives (TOFA), coconut oil and its derivatives, tallow fatty acid and its derivatives (Tallow), naphthenic acids and its derivatives, soya fatty acid and its derivatives (Soya), oleic acid and its derivatives.

The ethylenediamine compound (A) is preferably selected from diethylenetriamine (DETA), triethylenetetramine (TETA), tetraethylenepentamine (TEPA), aminoethylethanolamine (AEEA) or any other polyethylendiamine.

The structure of an imidazoline has been described below.

(C)

R results from the ethylenediamine compound substitution and, as described above, most commonly is either DETA, TETA, TEPA, AEEA and polyamine. Generally however it can be any type of ethylenediamine containing compound.

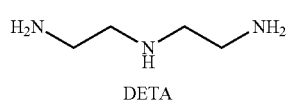
DETA (4)

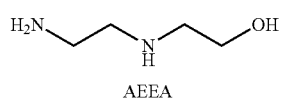
AEEA (5)

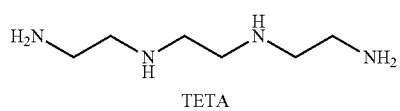
TETA (6)

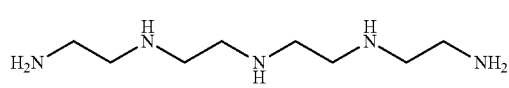
TEPA (7)

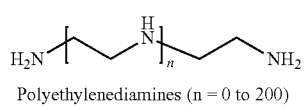
Polyethylenediamines (n = 0 to 200) (8)

There are many commercial imidazolines available and the choice of imidazoline is wide and for the current corrosion inhibitor formulations may include, but not be limited to, 1:1 (molar ratio) TOFA/DETA imidazoline, 2:1 TOFA/DETA amido imidazoline, 1:1 TOFA/TETA imidazoline, 2:1 TOFA/TETA amido-imidazoline, 2:1 TOFA/TETA bisimidazoline, 1:1 TOFA/TEPA imidazoline, 2:1 TOFA/TEPA amido imidazoline, 2:1 TOFA/TEPA bisimidazoline, 3:1 TOFA/TEPA amido bisimidazoline, 1:1 TOFA/AEEA imidazoline, 2:1 TOFA/AEEA amido imidazoline, 1:1 TOFA/polyamine imidazoline, 2:1 TOFA/polyamine imidazoline, 2:1 TOFA/polyamine amido imidazoline, 2:1 TOFA/polyamine bisimidazoline, 3:1 TOFA/TEPA polyamine amido bisimidazoline, 1:1 Soya/DETA imidazoline, 2:1 Soya/DETA amido-imidazoline, 1:1 Soya /TETA imidazoline, 2:1 Soya/TETA amido imidazoline, 2:1 Soya/TETA bisimidazoline, 1:1 Soya/TEPA imidazoline, 2:1 Soya/TEPA amido imidazoline, 2:1 Soya/TEPA bisimidazoline, 3:1 TOFA/TEPA amido bisimidazoline, 1:1 Soya/AEEA imidazoline, 2:1 Soya/AEEA amido imidazoline, 1:1 Soya/polyamine imidazoline, 2:1 Soya/polyamine imidazoline, 2:1 Soya/polyamine amido imidazoline, 2:1 Soya/polyamine bisimidazoline, 1:1 Tallow/DETA imidazoline, 2:1 Tallow/DETA amido-imidazoline, 1:1 Tallow/TETA imidazoline, 2:1 Tallow/TETA amido-imidazoline,2:1 Tallow/TETA bisimidazoline, 1:1 Tallow/TEPA imidazoline, 2:1 Tallow/TEPA amido imidazoline, 2:1 Tallow/TEPA bisimidazoline, 3:1 Tallow/TEPA amido bisimidazoline, 1:1 Tallow/AEEA imidazoline, 2:1 Tallow/AEEA amido imidazoline, 1:1 Tallow/polyamine imidazoline, 2:1 Tallow/polyamine imidazoline, 2:1 Tallow/polyamine amido imidazoline, 2:1 Tallow/polyamine bisimidazoline and 3:1 Tallow/TEPA poly amine amido bisimidazoline—there are also products that have different molar ratios of acid to amine and all molar ratios can be considered for the corrosion inhibiting formulations in the instant Application. The molar ratios above refer to the molar amounts of the compounds according to formulae (A) and (B), and their reaction may form a mixture of the compounds according to formulae (C) and (D).

The imidazoline is preferably selected from TOFA-DETA imidazolines, TOFA-polyamine imidazolines or TOFA-TEPA imidazoline.

Group 2b)

The sulfur synergists are generically any sulfur containing compound, either ionic or covalent by nature.

The preferred sulfur synergists fall into 5 generic categories as described by the following formulae:

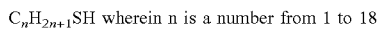

$C_nH_{2n+1}SH$ wherein n is a number from 1 to 18

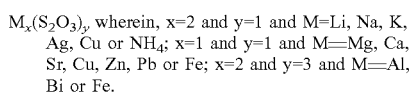

$M_x(S_2O_3)_y$ wherein, x=2 and y=1 and M=Li, Na, K, Ag, Cu or $NH_4$; x=1 and y=1 and M=Mg, Ca, Sr, Cu, Zn, Pb or Fe; x=2 and y=3 and M=Al, Bi or Fe.

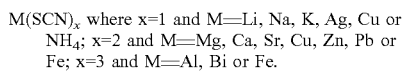

$M(SCN)_x$ where x=1 and M=Li, Na, K, Ag, Cu or $NH_4$; x=2 and M=Mg, Ca, Sr, Cu, Zn, Pb or Fe; x=3 and M=Al, Bi or Fe.

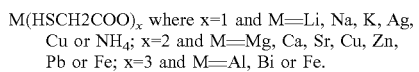

$M(HSCH2COO)_x$ where x=1 and M=Li, Na, K, Ag, Cu or $NH_4$; x=2 and M=Mg, Ca, Sr, Cu, Zn, Pb or Fe; x=3 and M=Al, Bi or Fe.

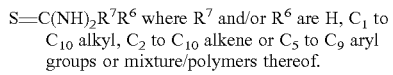

$S=C(NH)_2R^7R^6$ where $R^7$ and/or $R^6$ are H, $C_1$ to $C_{10}$ alkyl, $C_2$ to $C_{10}$ alkene or $C_5$ to $C_9$ aryl groups or mixture/polymers thereof.

The sulfur synergists are preferably selected from the group consisting of thioglycolic acid, sodium thiosulfate, ammonium thiosulfate, ammonium thiosulfate, sodium thiosulfate, potassium thiosulfate, potassium thiosulfite, thiourea, sodium thiocyanate, ammonium thiocyanate, and calcium thiocyanate, sodium thioglycolate, ammonium thioglycolate, polythioureas and derivatives such as 1,2-diethylthiourea, propylthiourea, 1,1-diphenylthiourea, thiocarbanilide, 1,2-dibutylthiourea, dithiourea thioacetamide, thionicotimide, or thiobenzamide, 2-Mercaptoethanol, 3-(Methylthio)propanol, thioacetic acid, cyste-amine, 3-Chloro-1-propanethiol, 1-mercapto-2-propanol, 2,3-Dimercapto-1-propanol, 2-Methoxyethane-thiol, 3-Mercapto-1-propanol, 2,3-Dimercapto-1-propanol, 1-Thio-glycerol, 1,3-Propane-dithiol, mercaptosuccinic acid, Cysteine, N-Carbomoyl-L-cysteine, N-Acetylcysteamine, 4-Mercapto-1-butanol, 1-Butanedithiol, 1,4-Butanedithiol, 2,2'-Thiodietanethiol, 4-Cyano-1-butanethiol, Cyclopentanethiol, 1,5-Pentanedithiol, 2-Methyl-1-butanethiol, 2,3,5,6-Tetrafluorobenzenethiophenol, 4-Chlorothiophenol, 2-Mercaptophenol, Thiophenol, Cyclohexylthiol, 4-Mercaptobenzoic acid, Thiosalicylic acid, 2-Ethylhexanethiol.

One preferred sulfur synergist is thioglycolic acid whose structure is:

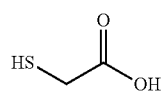
(9)

In another preferred embodiment, 2-mercaptoethanol is used, whose structure is:

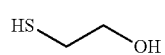
(10)

In yet another preferred embodiment, ammonium thiosulfate is used, whose structure is:

$(NH_4)_2S_2O_3$ (11)

Group 2c)

The phosphate esters or organophosphates are preferably of the generic formula:

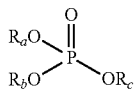
(12)

wherein $R_a$, $R_b$ and $R_c$ independently are selected from H or a hydrocarbon group, which may contain oxygen or nitrogen atoms, with a carbon atom number ranging from 1 to 49.

In a preferred embodiment, at least one of Ra, Rb and Rc are ethoxy groups.

In another preferred embodiment, at least one of Ra, Rb and Rc is an alkyl or alkenyl residue.

In another preferred embodiment, the number of carbon atoms in Ra, Rb or Rc is from 4 to 30 carbon atoms, preferably 8 to 22, more preferably 12 to 18 carbon atoms.

Ra, Rb and Rc may be preferably be terminated by hydrogen. The terminal hydrogen atom may be substituted by hydroxyl, benzyl or carboxylic acid groups. The carbon chains themselves may be saturated or unsaturated depending on the source of the carbon chain species or degree of ethoxylation. In one embodiment, they contain intrahydrocarbon chain groups such as carboxyl group (—COO—), oxygen (—O—), or a secondary amine group (—NH—). Intrahydrocarbon means that such groups are not terminal groups.

In one preferred embodiment of the invention, phosphoric acid 2-ethylhexylester is the phosphate ester species used, the structure of which has been displayed below:

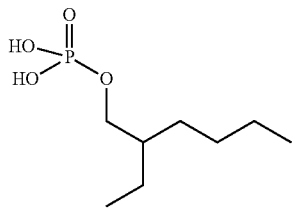
(13)

In another preferred embodiment of the invention uses poly(oxy-1,2-ethanediyl) alpha-isotridecyl-omega-hydroxy-, phosphate:

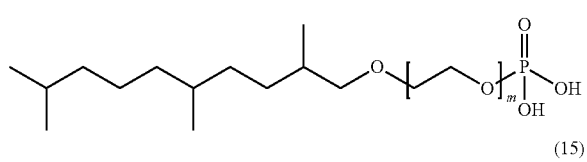
(14)

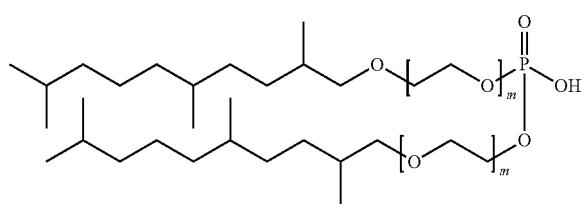
(15)

m is a number from 1 to 200, preferably 2 to 100, more preferably 3 to 20 and most preferably 5 to 15.

Yet another preferred embodiment of the invention uses 2-Ethyl hexyl mono/di phosphoric acid ester, acid:

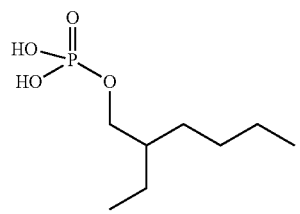
(16)

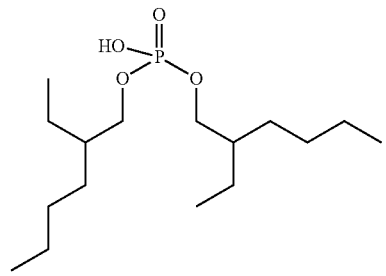
(17)

To one skilled in the art it is well known that the use of straight chained alkyl or alkenyl groups for Ra, Rb and Rc versus highly branched groups is preferred when one considers the biodegradation of the final phosphate ester molecule. A highly branched alkyl or alkenyl grouped phosphate ester displays a much higher biodegradation as naturally occurring bacteria are more able to degrade the molecule when compared to a straight chained alkyl or alkenyl group. Furthermore the mono- to di-ester ratio is a variable that has been discovered to affect the emulsion forming tendency of the phosphate ester molecule when oil and water mixtures are present. This is also known to one skilled in the art where highly mono-ester rich phosphate esters do not promote the formation of oil-water emulsions and the presence of high concentrations of di-ester phosphate esters have a tendency to create more persistent oil-water emulsions.

Group 3

A surfactant is defined herein as a compound that will decrease the surface tension when added to the aqueous compositions as described herein. In a comparison of aqueous composition with and without a surfactant, the composition with a surfactant must have a lower surface tension.

It has been found that the presence of a surfactant is bebeficial to the success of the dithiazine dissolution.

In a preferred embodiment, the surfactant is a compound having a hydrophile-lipophile balance (HLB) value between 11-16, preferably between 12 and 14. For the purpose of this invention, HLB values are to be determined using method EN 12836:2002 (Surface active agents—Determination of the water number of alkoxylated products).

Surfactants for use in the present invention typically contain hydrophobic groups such as polysiloxane, polyoxypropylene, alkyl/aryl, aryl, alkyl, cycloalkyl, alkenyl, cycloalkenyl, or more complex aryl (such as petroleum sulfonates) moieties being from $C_8$ to $C_{22}$, and preferably $C_{10}$ to $C_{20}$, commonly $C_{12}$ to $C_{18}$, and a hydrophilic moiety which preferably is a polyethoxy group with 5 to 20 ethoxy units.

The surfactant may, for example, comprise or consist of an at least sparingly water-soluble salt of sulfonic or monoesterified sulfuric acids, i.e. an alkylbenzene sulfonate, alkyl ether sulfate, alkyl sulfate, olefin sulfonate, alkane sulfonate, alkylphenol sulfate, alkylphenol ether sulfate, alkylethanolamide sulfate, alkylethanolamidether sulfate, or alpha sulfo fatty acid or its ester each having at least one alkyl or alkenyl group with from $C_8$ to $C_{22}$, more usually $C_{10}$ to $C_{20}$, aliphatic atoms. alkyl sulfate, alkyl ether sulfate, olefin sulfonate, alkane sulfonate, alkylphenol sulfate, alkylphenol ether sulfate, alkylethanolamide sulfate, alkylethanolamidether sulfate, or alpha sulfo fatty acid or its ester each having at least one alkyl or alkenyl group with from $C_8$ to $C_{22}$, more usually $C_{10}$ to $C_{20}$, aliphatic atoms.

The expression "ether" herein refers to compounds containing one or more oxyalkylene or polyoxyalkylene group. A polyoxyalkyene group preferably has from 2 to 150 oxyethylene and/or oxypropylene units. One or more oxybutylene groups may be additionally, or alternatively to the polyoxypropylene groups, present.

For example, the sulfonated or sulfated surfactant may be sodium dodecyl benzene sulfonate, potassium hexadecyl benzene sulfonate, sodium dodecyl, dimethyl benzene sulfonate, sodium lauryl sulfate, sodium tallow sulfate, potassium oleyl sulfate, ammonium lauryl sulfate, sodium tallow sulfate, potassium oleyl sulfate, ammonium lauryl monoethoxy sulfate, or monethanolamine cetyl 10 mole ethoxylate sulfate.

Other anionic surfactants useful according to the current invention include alkyl sulfosuccinates, such as acyl taurides, alkyl ether sulfosuccinates, isethionates, palmitates, resinates, oleates, linoleates, soaps such as stearates, alkyl ether carboxylates and sodium dihexylsulfosuccinate.

Anionic phosphate esters and alkyl phosphonates, alkylamino and imino methylene phosphonates may be used as surfactant. In each case the anionic surfactant typically contains at least one alkyl or alkenyl chain having from $C_8$ to $C_{22}$, preferably $C_{10}$ to $C_{20}$. In the case of ethers, there is one or more glyceryl group, and/or from 1 to 150 oxyethylene and/or oxypropylene and/or oxybutylene groups. Preferred anionic surfactants are sodium salts. Other salts of commercial interest include those of potassium, lithium, calcium, magnesium, ammonium, monoethanolamine, diethanolamine, triethanolamine, alkyl amines containing up to seven aliphatic carbon atoms, and alkyl and/or hydroxyl alkyl phosphonium.

The surfactant component of the present invention may optionally comprise or consist of non-ionic surfactants. The non-ionic surfactant may be e.g. $C_{10}$ to $C_{22}$ alkanolamides of a mono or di-lower alkanolamine, such as coconut monoethanolamide. Other non-ionic surfactants which may optionally be present, include tertiary acetylenic glycols, polyethoxylated alcohols, polyethoxylated mercaptans, glucamines and their alkoxylates, glucamides and their alkoxylates, alkylpolyglucosides, polyethoxylated carboxylic acids, polyethoxylated amines, polyethoxylated alkylolamides, polyethoxylated alkylphenols, polyethoxylated glyceryl esters, polyethoxylated sorbitan esters, polyethoxylated phosphate esters, and the propoxylated, or ethoxylated and propoxylated derivatives of all the aforesaid ethoxylated non-ionics, all having a $C_8$ to $C_{22}$ alkyl or alkenyl group and up to 20 ethyleneoxy and/or propyleneoxy groups. Also included are polyoxypropylene/polyethylene oxide block copolymers, polyoxybutylene/polyoxyethylene copolymers and polyoxybuylene/polyoxypropylene copolymers. The polyethoxy, polyoxypropylene and polyoxybutylene compounds may be end capped with, e.g. benzyl groups to reduce the foaming tendency.

Compositions of the present invention may contain an amphoteric surfactant. The amphoteric surfactant may for example be a betaine, e.g. a betaine of the formula $(R^9)_3N^+CH_2COO^-$, wherein each $R^9$ may be the same or different and is an alkyl, cycloalkyl, alkenyl or alkaryl group and preferably at least one, and more preferably not more than one $R^9$ has an average of from $C_8$ to $C_{20}$, e.g. $C_{10}$ to $C_{18}$ of an aliphatic nature and each other $R^9$ has an average of from $C_1$ to $C_4$.

Other amphoteric surfactants for use according to the current invention include quaternary imidazolines, alkyl amine ether sulfates, sulfobetaines and other quaternary amine or quaternised imidazoline sulfonic acids and their salts, and zwitterionic surfactants, e.g. N-alkyl taurines, carboxylate amidoamines such as

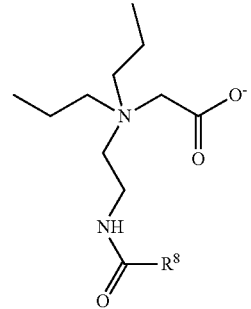

(18)

wherein $R^8$ is selected from the group consisting of alkyl, alkenyl, cycloalkyl and alkylaryl having 8 to 20 carbon atoms, preferably alkyl or alkenyl groups and amido acids having, in each case, hydrocarbon groups capable of conferring surfactant properties. Typical examples include 2-tallow alkyl, 1-tallow amido alkyl, 1-carboxymethyl imidazoline and 2-coconut alkyl N-carboxymethyl 2 (hydroxyalkyl) imidazoline. Generally speaking any water soluble amphoteric or zwitterionic surfactant compound which comprises a hydrophobic portion including $C_8$ to $C_{20}$ alkyl or alkenyl group and a hydrophilic portion containing an amine or quaternary ammonium group and a carboxylate, sulfate or sulfonic acid group may be used in the present invention.

Compositions of the present invention may also include cationic surfactants. The cationic surfactant may for example be a quaternary ammonium compound of the formula (19):

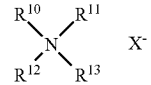

(19)

wherein
$R_{11}$ is a $C_5$ to $C_{21}$ aliphatic hydrocarbon group,
X is an anionic counter ion, and
$R^{10}$, $R^{12}$, $R^{13}$ are selected from the group consisting of hydrogen, methyl, ethyl, allyl, propyl, butyl, phenyl or benzyl residues, Typically alkylammonium surfactants for use according to the invention have one or at most two long aliphatic chains per molecule (e.g. chains having an average of $C_8$ to $C_{20}$ each, usually $C_{12}$ to $C_{18}$) and two or three short chain alkyl groups having $C_1$ to $C_4$ each, e.g. methyl or ethyl groups, preferably methyl groups. Typical examples include dodecyl trimethyl ammonium salts. Benzalkonium salts having one $C_8$ to $C_{20}$ alkyl group, two $C_{10}$ to $C_{20}$ alkyl groups and a benzyl group are also useful. Another useful class of cationic surfactant according to the present invention comprises N-alkyl pyridinium salts wherein the alkyl group has an average of from $C_8$ to $C_{22}$, preferably $C_{10}$ to $C_{20}$. Other similarly alkylated heterocyclic salts, such as N-alkyl isoquinolinium salts, may also be used. Alkylaryl dialkylammonium salts in which the alkylaryl group is an alkyl benzene group having an average of from $C_8$ to $C_{22}$, preferably $C_{10}$ to $C_{20}$ and the other two alkyl groups usually have from $C_1$ to $C_4$, e.g. methyl groups are useful. Other classes of cationic surfactants which are of use in the present invention include so called alkyl imidazoline or quaternized imidazoline salts having at least one alkyl group in the molecule with an average of from $C_8$ to $C_{22}$ preferably $C_{10}$ to $C_{20}$. Typical examples include alkyl methyl hydroxyethyl imidazolinium salts, alkyl benzyl hydroxyethyl imidazolinium salts, and 2 alkyl-1-alkylamidoethyl imidazoline salts. Another class of cationic surfactants for use according to the current invention comprises the amido amines such as those formed by reacting a fatty acid having $C_2$ to $C_{22}$ or an ester, glyceride or similar amide forming derivative thereof, with a di or poly amine, such as, for example, ethylene diamine or diethylene triamine, in such a proportion as to leave at least one free amine group. Quaternized amido amines may similarly be employed. Alkyl phosphonium and hydroxyalkyl phosphonium salts having one $C_8$ to $C_{20}$ alkyl group and three $C_1$ to $C_4$ alkyl or hydroxyalkyl groups may also be used as cationic surfactants in the present invention. Typically the cationic surfactant may be any water soluble compound having a positively ionized group, usually comprising a nitrogen atom, and either one or two alkyl groups each having an average of from $C_8$ to $C_{22}$. The anionic portion of the cationic surfactant may be any anion which confers water solubility, such as formate, acetate, lactate, tartrate, citrate, chloride, nitrate, sulfate or an alkylsulfate ion having up to $C_4$ such as a higher alkyl sulfate or organic sulfonate. Polyfluorinated anionic, nonionic or cationic surfactants may also be useful in the compositions of the present invention. Examples of such surfactants are polyfluorinated alkyl sulfates and polyfluorinated quaternary ammonium compounds.

Compositions of the current invention may contain a semi-polar surfactant such as an amine oxide e.g. an amine oxide containing one or two (preferably one) $C_8$ to $C_{22}$ alkyl group, the remaining substituent or substituents being preferably lower alkyl groups, e.g. $C_1$ to $C_4$ alkyl groups or benzyl groups. Particularly preferred for use according to the current invention are surfactants which are effective as wetting agents, typically such surfactants are effective at lowering the surface tension between water and a hydrophobic solid surface. Surfactants are preferred which do not stabilize foams to a substantial extent.

One preferred embodiment uses a surfactant including at least one N-Alkyl-N-acylglucamine according to formula (20)

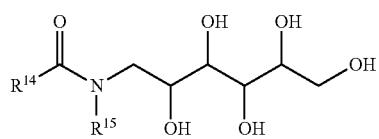

wherein $R^{14}$ is a linear or branched, saturated or unsaturated $C_5$-$C_{21}$-hydrocarbon residue, preferably a $C_7$-$C_{13}$-hydrocarbon residue, and $R^{15}$ is a $C_1$-$C_4$ alkyl residue, preferably methyl.

In another preferred embodiment, the N-Alkyl-N-acylglucamines comprise at least 50 wt.-% of the total amount of N-Alkyl-N-acylglucamines (20) compounds with $R^{14}$ being $C_7$-$C_9$-alkyl and at most 50 wt.-% of the total amount of N-Alkyl-N-acylglucamines (20) compound with $R^{14}$ being $C_{11}$-$C_{13}$-alkyl.

In another preferred embodiment, the surfactant is including at least one cyclic N-Alkyl-N-acylglucamine of the formulae

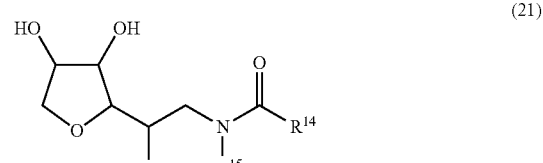

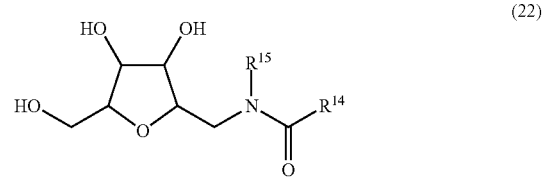

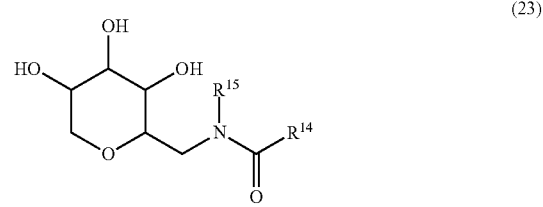

whereas in formulae (21), (22) and (23)

$R^{14}$ is a linear or branched, saturated or unsaturated $C_5$-$C_{21}$-alkyl residue, preferably a $C_7$-$C_{13}$-alkyl residue, and $R^{15}$ is a $C_1$-$C_4$-alkyl residue, preferably methyl.

In yet another preferred embodiment, the surfactant is nonyl phenol ethoxylate

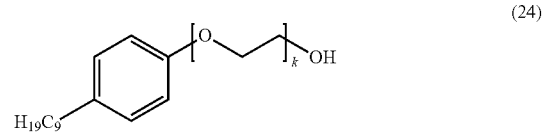

wherein k is a number from 1 to 20, preferably 6 to 15, more preferably 8 to 12.

Mixtures of two or more of the foregoing surfactants may be used. In particular mixtures of non-ionic surfactants with cationic and/or amphoteric and/or semi polar surfactants or with anionic surfactants may be used. Typically mixtures of anionic and cationic surfactants are avoided, which are often less mutually compatible. The surfactants in the compositions of the current invention may be used as a bio-penetrant.

Group 4

The solvent comprises a group of components that form the make up or remainder of the formulation.

The inventive use or process may in one preferred embodiment occur in an aqueous medium. In one preferred embodiment, water makes the balance to 100 wt-% from the content in oxidizer and corrosion inhibitor.

In another preferred embodiment, there is another solvent together with water present, selected from the group consisting of aliphatic alcohols, aliphatic diols, aliphatic polyhydric alcohols, and aliphatic or aromatic hydrocarbons.

In a preferred embodiment the solvent comprises one or more components selected from the group consisting of monohydric alkyl alcohols having 1 to 8 carbon atoms, dihydric aliphatic alcohols having 2 to 6 carbon atoms and $C_1$ to $C_4$ alkyl ethers of said alcohols. More preferably, the solvent is selected from the group consisting of water, methanol, ethanol, monoethylene glycol, triethylene glycol, 2-butoxyethanol, 2-ethylhexanol, isopropanol, pentanol, butanol, or mixtures thereof.

In a preferred embodiment methanol is present as solvent. In another preferred embodiment a blend of monoethylene glycol and 2-butoxyethanol is used as solvent. In yet another preferred embodiment, a blend of methanol and 2-butoxyethanol is used as solvent.

The aqueous dithiazine dissolver of the instant invention is capable of dissolving amorphous dithiazine at ambient temperature. Ambient temperature shall mean a temperature range of 20° C. to −10° C.

The dithiazine dissolution according to the instant invention is an exothermic reaction which causes a temperature rise dependent upon the concentration of peroxide used. It can reach the boiling point of the aqueous acid and cause a flash boiling event if not controlled. Typically the exothermicity which is a result of the initial reaction at ambient temperature is controlled by reducing the concentration of the peroxide.

This injection fluid used to inject the composition of the instant invention may additionally contain, other ingredients known to those familiar with the art, including but not restricted to acids, dispersants, viscosifiers, lubricity agents, scale inhibitors, friction reducers, crosslinker, surfactants, scavenger pH adjuster, iron control agents, breakers. This is especially true if any produced water (or recycled water) is used to perform the treatment.

Employing the embodiments of the instant invention not only dissolves the amorphous dithiazine solids that are fouling a given system but also improve nullification of the treatment to render it benign and non-corrosive and damaging to the integrity of the metallurgy and equipment it will be used to treat, thus allowing better integrity management, dithiazine dissolution and corrosion inhibition. Other applications of the embodiments of the instant invention include treating water for downhole injection for pressure support, treatment of water for drilling and work-over use, wettability alteration and well cleanout.

EXAMPLES

If not stated otherwise, references to % or ppm mean wt.-% or weight -ppm throughout this specification.

In order to clearly and demonstrably illustrate the current invention, several examples have been presented below, these are however, non-limiting and have been specifically chosen to show those skilled in the art, the logic taken to arrive at the final formulations.

Example 1: Dissolver Test Data

The following work shows the efficacy of dissolution of various substances of the prior art (marked as C for comparative in Table 1) and of the inventive compositions. Static dissolution tests were performed using 10 grams of dissolver solution and 0.5 grams of amorphous dithiazine sample. All tests were performed at 20° C. and were run for 6 hours. The amorphous dithiazine was carefully pre-weighed and then after the test, was dried and prepared accordingly and reweighed thus calculating a weight loss and therefore a dissolution percentage. In all tests the dissolver solution contained 10 wt.-% of the main component in order to match up activity. The main component is the compound mentioned in the column "Dissolver Formulation" in Table 1. The dilution water used was deionized. The test data has been summarized in Table 1.

TABLE 1

Tests on amorphous dithiazine using current known art and inventive examples

| No. | Dissolver Formulation | Amorphous Dithiazine Laboratory Generated (Weight Loss %) | Amorphous Dithiazine Field Sample (Weight Loss %) | Temperature (° C.) |
| --- | --- | --- | --- | --- |
| 1.0 (comp.) | Hydrogen peroxide | 0.0 | 0.0 | 20 |
| 1.1 (comp.) | Hydrogen peroxide | 5.6 | 5.6 | 65 |
| 1.2 | Peracetic acid | 100.0 | 100.0 | 20 |

The performance of the inventive components from Group 1 are noted to yield higher performance than the comparative examples of the prior art.

Example 2: Corrosivity of Tested Amorphous Dithiazine Dissolvers

In order to test, experimentally, the corrosivity of the instant invention and the other state-of-the-art chemistries, ASTM standard testing was performed (ASTM G31-72 and ASTM D471) on the fluids using a carbon steel (C1018) and stainless steel (SS316L) metallurgy. Tests were run for 24 hours in a static jar test at 40° C. The results can be seen in Table 2 and the clear benefit of the instant invention can be discerned.

The corrosion inhibitor used was a combination of one component from each of groups 2a, 2b and 2c as mentioned above. It comprised a TOFA-DETA-Imidazoline, thioglycolic acid and an ethoxylated phosphate ester.

TABLE 2

Corrosivity tests on amorphous dithiazine dissolvers using the current invention and from the prior art

| No. | Dissolver Formulation | Corrosivity (mpy) C1018 | Corrosivity (mpy) SS316L |
| --- | --- | --- | --- |
| 2.1 C | Hydrogen peroxide | >2,000 | >2,000 |
| 2.2 C | Peracetic acid | >2,000 | >2,000 |

TABLE 2-continued

Corrosivity tests on amorphous dithiazine dissolvers
using the current invention and from the prior art

| No. | Dissolver Formulation | Corrosivity (mpy) C1018 | Corrosivity (mpy) SS316L |
|---|---|---|---|
| 2.3 | Peracetic acid + 5000 ppm of Corrosion Inhibitor 1 | 1.82 | 2.92 |
| 2.4 | Peracetic acid + 5000 ppm of Corrosion Inhibitor 2 | 2.92 | 4.67 |

Corrosion Inhibitor 1 is a proprietary product that contains 25 wt-% of a phosphate ester.

Corrosion inhibitor 2 is a commercial product that comprises a blend of quinoline quaternary ammonium alkyl amine salts, an alkyl thioamide, and oxyalkylated phenols.

This result shows that the corrosivity of peracetic acid may be mitigated by a corrosion inhibitor, a phosphate ester being particulary effective.

Example 3: Dissolution of Inventive Formulation Combinations

The following work shows the efficacy of dissolution of various inventive compositions that incorporate Group 2, 3 and 4 components to show that the presence of a corrosion inhibitor package does not affect the efficacy of dissolution. Static dissolution tests were performed using 10 grams of dissolver solution and 0.5 grams of amorphous dithiazine sample. All tests were performed at 20° C. and were run for 6 hours. The amorphous dithiazine was carefully pre-weighed and then after the test, was dried and prepared accordingly and reweighed thus calculating a weight loss and therefore a dissolution percentage. Like in Example 1 in all tests 10 wt.-% of the main component was used in order to match up activity. The surfactant used was a nonyl phenol ethoxylate and the solvent used was 2-butoxyethanol/water. The water used was deionized. The test data has been summarized in Table 3.

TABLE 3

Dissolution tests on amorphous dithiazine dissolvers
using variations of the instant invention

| No. | Dissolver Formulation | Amorphous Dithiazine Laboratory Generated (Weight Loss %) | Amorphous Dithiazine Field Sample (Weight Loss %) |
|---|---|---|---|
| 3.1 | Hydrogen peroxide + 2% Corrosion Inhibitor | 5.6 | 5.0 |
| 3.2 | Peracetic acid + 2% Corrosion Inhibitor | 100.0 | 100.0 |
| 3.3 | Hydrogen peroxide + 2% Corrosion Inhibitor + 2% surfactant | 5.6 | 5.0 |
| 3.4 | Peracetic acid + 2% Corrosion Inhibitor + 2% surfactant | 100.0 | 100.0 |
| 3.5 | Hydrogen peroxide + 2% Corrosion Inhibitor + 10% solvent | 5.3 | 5.0 |
| 3.6 | Peracetic acid + 2% Corrosion Inhibitor + 10% solvent | 100.0 | 100.0 |
| 3.7 | Hydrogen peroxide + 2% Corrosion Inhibitor + 2% surfactant + 10% solvent | 5.2 | 5.0 |
| 3.8 | Peracetic acid + 2% Corrosion Inhibitor + 2% surfactant + 10% solvent | 100.0 | 100.0 |

The invention claimed is:

1. A method for dissolving amorphous dithiazine, the method comprising adding an aqueous composition comprising at least one organic peroxide as dithiazine dissolver to the dithiazine-containing system.

2. The method according to claim 1, wherein the aqueous composition comprises 0.1 to 35 wt. % of the organic peroxide.

3. The method according to claim 1, wherein the aqueous composition further comprises 0.1 to 6 wt. % of a corrosion inhibitor.

4. The method according to claim 3, wherein the corrosion inhibitor comprises at least one imidazoline and amidoamine, the total concentration of the imidazoline and amidoamine being from 1 to 3 wt. %.

5. The method according to claim 3, wherein the corrosion inhibitor comprises at least one sulfur synergist, the concentration of the sulfur synergist being from 0.05 to 5 wt. %.

6. The method according to claim 3, wherein the corrosion inhibitor comprises at least one phosphate ester, the concentration of the phosphate ester being from 0.05 to 5 wt. %.

7. The method according to claim 3, wherein the corrosion inhibitor comprises at least one a phosphate ester, at least one sulfur synergist and at least one imidazoline and amidoamine.

8. The method according to claim 1, wherein the organic peroxide is peracetic acid.

9. The method according to claim 3, wherein the corrosion inhibitor comprises at least one imidazoline and amidoamine according to the formulae C and D

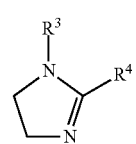

(C)

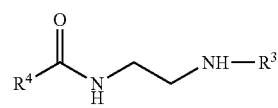

(D)

wherein
$R^3$ is —H, —$C_2H_4NH_2$, —$C_2H_4OH$, —$(C_2H_4NH)_x$—$C_2H_4NH_2$,
X is a number from 0 to 200,
$R^4$ is a $C_3$ to $C_{29}$ aliphatic hydrocarbon group.

10. The method according to claim 3, wherein the corrosion inhibitor comprises at least one sulfur synergist selected from the group consisting of the formulae $C_nH_{2n+1}SH$ wherein n is a number from 1 to 18;
$M_x(S_2O_3)_y$ wherein x=2 and y=1 and M=Li, Na, K, Ag, Cu or NH4, x=1 and y=1 and M=Mg, Ca, Sr, Cu, Zn, Pb or Fe, x=2 and y=3 and M=Al, Bi or Fe;
$M(SCN)_x$ wherein x=1 and M=Li, Na, K, Ag, Cu or NH4, x=2 and M=Mg, Ca, Sr, Cu, Zn, Pb or Fe, x=3 and M=Al, Bi or Fe;
$M(HSCH_2COO)_x$ wherein x=1 and M=Li, Na, K, Ag, Cu or NH4, x=2 and M=Mg, Ca, Sr, Cu, Zn, Pb or Fe, x=3 and M=Al, Bi or Fe; and
$S=C(NH)_2R^7R^6$ wherein $R^7$ and/or $R^6$ are independently selected from the group consisting of H, $C_1$ to $C_{10}$ alkyl, $C_2$ to $C_{10}$ alkenyl or $C_5$ to $C_9$ aryl groups.

11. The method according to claim 3, wherein the corrosion inhibitor comprises at least one phosphate ester of the formula (12)

$$R_aO-\underset{\underset{OR_c}{|}}{\overset{\overset{O}{\|}}{P}}-OR_b \quad (12)$$

wherein $R_a$, $R_b$ and $R_c$ independently are selected from H or a hydrocarbon group, which may contain oxygen or nitrogen atoms, with a carbon atom number ranging from 1 to 49.

12. The method according to claim 11, wherein at least one of $R_a$, $R_b$ and $R_c$ comprises one or more ethoxy groups.

13. The method according to claim 11, wherein at least one of $R_a$, $R_b$ and $R_c$ comprises an alkyl or alkenyl group.

14. The method according to claim 11, wherein the number of carbon atoms in at least one of $R_a$, $R_b$ or $R_c$ is from 4 to 30.

15. The method according to claim 1, wherein the aqueous composition further comprises a surfactant.

16. The method according to claim 15, wherein the surfactant has an HLB value of 11 to 16.

17. The method according to claim 15, wherein the concentration of the surfactant is from 1 to 20 wt. %.

18. The method according to claim 15, wherein the surfactant is selected from the group consisting of
a) N-Alkyl-N-acylglucamine (20)

wherein $R^{14}$ is a linear or branched, saturated or unsaturated $C_5$-$C_{21}$-hydrocarbon residue, preferably a $C_7$-$C_{13}$-hydrocarbon residue, and $R^{15}$ is a $C_1$-$C_4$ alkyl residue.

b) a mixture of at least 50 wt. % of the total amount of N-Alkyl-N-acylglucamines according to formula (20) with $R^{14}$ being a $C_7$-$C_9$-alkyl residue and at most 50 wt. % of the total amount of N-Alkyl-N-acylglucamines according to formula (20) with $R^{14}$ being a $C_{11}$-$C_{13}$-alkyl residue, and
c) a cyclic N Alkyl-N-acylglucamine of the formulae (21)

(22)

(23)

whereas in formulae (21), (22) and (23) $R^{14}$ is a linear or branched, saturated or unsaturated $C_5$-$C_{21}$-alkyl residue, preferably a $C_7$-$C_{13}$-alkyl residue, and $R^{15}$ is a $C_1$-$C_4$-alkyl residue.

19. The method according to claim 15, wherein the surfactant is a nonyl phenol ethoxylate according to formula (24)

(24)

wherein k is a number from 1 to 20.

20. The method according to claim 1, wherein an organic solvent is present.

21. The method according to claim 20, wherein the solvent is selected from the group consisting of monohydric alkyl alcohols having 1 to 8 carbon atoms, dihydric aliphatic alcohols having 2 to 6 carbon atoms and $C_1$ to $C_4$ alkyl ethers of the mono- and dihydric alcohols.

22. The method according to claim 20, wherein the solvent is present in a concentration of 0.1 to 30 wt. %.

23. The method according to claim 1, wherein water is present in an amount to balance to 100 wt. %.

* * * * *